H. LORENZ.
TURBINE OR CENTRIFUGAL PUMP.
APPLICATION FILED SEPT. 23, 1905.
963,378.
Patented July 5, 1910.
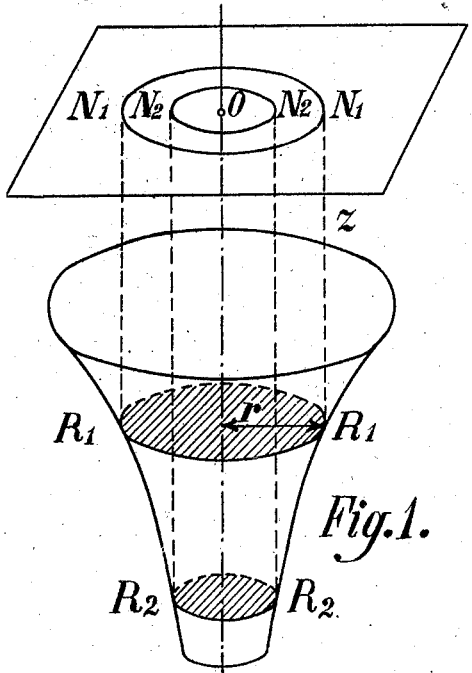
Fig. 1.
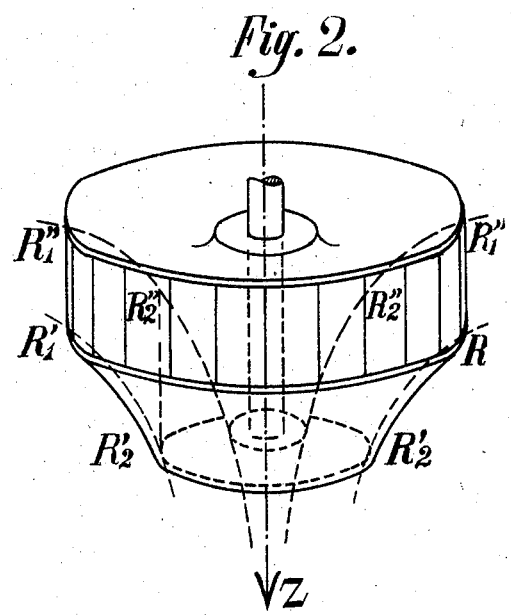
Fig. 2.
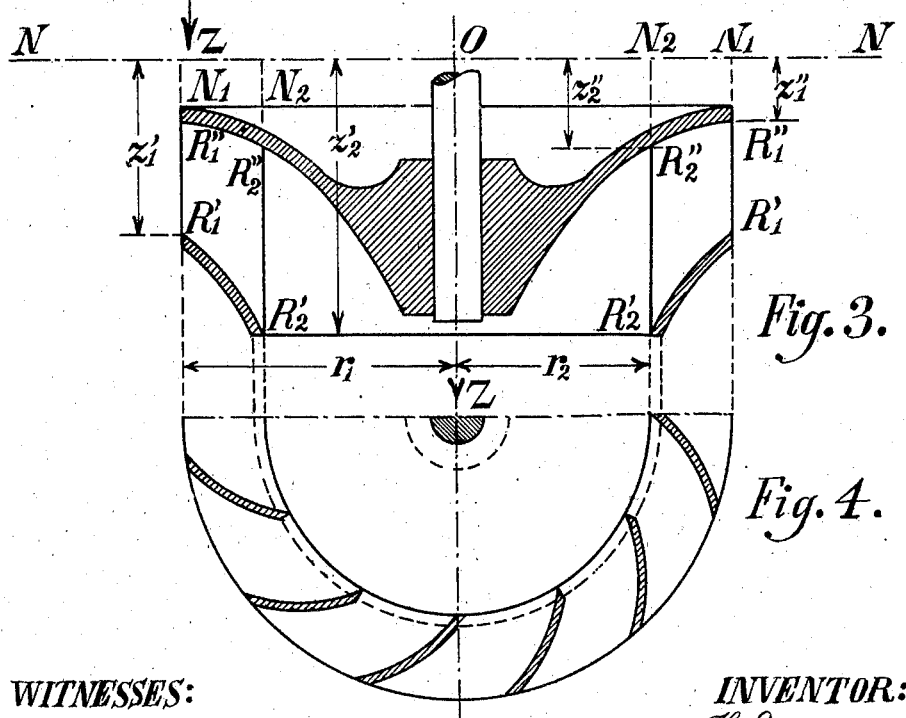
Fig. 3.
Fig. 4.
WITNESSES:
INVENTOR:
H. Lorenz.
BY
ATTORNEYS

UNITED STATES PATENT OFFICE.

HANS LORENZ, OF LANGFUHR-DANZIG, GERMANY.

TURBINE OR CENTRIFUGAL PUMP.

963,378.  Specification of Letters Patent.  Patented July 5, 1910.

Application filed September 23, 1905. Serial No. 279,847.

*To all whom it may concern:*

Be it known that I, HANS LORENZ, professor of mechanics of the Royal Technical College of Danzig and doctor of philosophy, a subject of the King of Prussia, German Emperor, residing at am Johannisberg 7, Langfuhr-Danzig, in the German Empire, have invented certain new and useful Improvements in Turbines or Centrifugal Pumps, of which the following is a full, clear, and exact description.

The walls and vanes of the rotary wheels of turbines, centrifugal pumps and fans as hitherto usually constructed are arbitrarily formed and limited.

It is the purpose of this invention to devise such shape of the walls and vanes of the wheel as to insure an equal transmission of energy of all elements of the elastic or unelastic fluid passing the wheel to fill it continuously and to avoid whirls. The condition of continuity requires that no stream lines of elements of fluid intersect each other. Hence the walls of the wheel along which the inner and the outer stream lines are conducted must follow two rotation surfaces around the axis not intersecting each other in any point. The generic equation of such rotation surfaces is $$f_1(rz) = \psi \quad \text{(Equation 1)}$$

$r$ being the distance of a point of the surface from the axis, $z$ the distance of the same point from a normal plane $N_1ON_1$ (Fig. 1) and $\psi$ being a constant defining the volume of the fluid passing per second between the surface and the axis. The most simple form of such surface is determined by the condition that all cylinders $R_1 N_1 N_1 R_1$ between the normal plane $N_1ON_1$ and the surface have the same volume $\pi r^2 z$, $\pi$ being the symbol for 3.14159. This volume of the cylinders $R_1 N_1 N_1 R_1$ and $R_2 N_2 N_2 R_2$ is proportional to the constant $\psi$ above mentioned defining the volume of fluid passing between the surface and the axis. Consequently, the volume of fluid passing a wheel bounded by two surfaces determined by the constants $\psi'$ and $\psi''$, will be determined by the difference $\psi' - \psi''$ and the differential volume of fluid passing between two consecutive surfaces separated by an indefinitely small distance is $d\psi$ and the corresponding weight of fluid is $dQ = s d\psi$, $s$ being the specific weight of said fluid.

In Fig. 2 of the drawings a wheel is shown perspectively, the walls of which are formed by two surfaces plotted in the method just described the outer surface being represented by the curves $R_1'' R_2'' R_1'$ $R_1'$, the inner wall respectively by the curves $R_1'' R_2'' R_2'' R_1''$. It will readily be seen that the volume of fluid passing between these two surfaces is given by the difference $\psi' - \psi''$, $\psi'$ and $\psi''$ being constants of the surfaces according to equation 1.

To avoid whirls the axial velocity of all elements passing the shaded area $R_1 R_1$ should have the same value $v$ and all elements passing the convex surface of the cylinder $R_1 N_1 N_1 R_1$ should have the same radial velocity $v$. Hence the time from passing the convex cylinder surface $R_1 N_1$ $N_1 R_1$ to $R_2 N_2 N_2 R_2$ must be equal for all elements of fluid.

Having thus shown the method by which any one familiar with the art will be enabled to design walls according to the present invention, I shall proceed to describe the means by which the vanes may be designed.

Referring now more particularly to the drawings, which form a part hereof and in which like characters of reference designate like parts throughout the several views: Figure 1 is a diagrammatic representation of the simple form of surface hereinabove theoretically considered. Fig. 2 is a perspective view of a wheel, the walls of which are formed by two surfaces of the type aforesaid. Fig. 3 is a meridional section through said wheel, and Fig. 4 is a normal section of the same taken through the vanes.

Euler has given before the following equation for the rotary moment M of the wheel $$dM = \frac{dQ}{g}\left((ur)_2 - (ur)_1\right) \quad \text{(Equation 2)}$$

$u$ being the absolute tangential velocity of the fluid which is variable along the paths of fluid through the wheel, $g$ the acceleration of gravity and the indices 1 and 2 indicating the entrance and exit.

The total weight of fluid is given by the term $Q = s(\psi' - \psi'')$ $s$ being the specific weight of fluid; so an element of the fluid is represented by the differential of this term $dQ = s d\psi$. Each element $dQ$ contributes to the turning moment the same amount only in case the moment (Equation 2) $u r$ of the tangential velocity $u$ has a constant value along the vane ends at the entrance and exit. This condition is complied with in the present invention through forming the entrance and the exit according to curves of the generic equation:

$$ur = f_2(rz) \quad \text{(Equation 3)}$$

in which $f_2(rz)$ indicates a function different from $f_1$ which has for the entrance and exit the parameters $(ur)_1$ and $(ur)_2$ of which one may be eliminated by the conditions of the special case. The conditions of an equal transmission of energy of all elements of fluid in the same time will be realized if these curves are situated on cylinders around the axis, the equation of these cylinders being given by $$ur = f_2(r) \quad \text{(Equation 4)}$$

$ur$ being independent of the distance $z$ between the element and the normal plane $N_1 O N_1$. The meridional sections of two of these cylinders $R^1{}_1 R^2{}_1$ and $R'_2 R''_2$ determine the edges of the vanes as shown in Fig. 2. Then by equation 2 the following equation is obtained:

$$M = \frac{Q}{g}\left((ur)_2 - (ur)_1\right) \quad \text{(Equation 5)}$$

where $Q$ is the total weight of fluid passing the wheel in a second. This equation 5 which in turbines of known construction is only applicable for an infinitely thin current of fluid holds good in a turbine constructed according to the present invention for the whole profile of the wheel.

It is evident that the form of the wheel as designed in Fig. 2 may be used for a turbine as well as for a pump or for a fan; while in Fig. 3 a meridional section through the wheel, in Fig. 4, and a normal section through the vanes are given. The vanes may be of any suitable shape with generatrices and edges $R_1' R_1''$ and $R_2' R_2''$ parallel to the axis of the wheel.

In Fig. 3 the above mentioned normal plane $N_1 O N_1$ is represented by a dash-dotted line. Let the distance of the intersecting points of the walls with the edges of the vanes in the meridional section of the wheel from this plane be $R'_1 N_1 = z'_1, R'_2 N_2 = z'_2, R''_1 N_1 = z''_1, R''_2 N_2 = z''_2$ and $r_1$ and $r_2$ the distances of the outer and inner edges from the axis then it follows from the equal volume of the cylinders $R'_1 N_1 N_1 R'_1 = R'_2 N_2 N_2 R'_2$; $R''_1 N_1 N_1 R''_1 = R''_2 N_2 N_2 R''_2$ or $\pi r_1^2 z'_1 = \pi r_2^2 z'_2, \pi r_1^2 z''_1 = \pi r_2^2 z''_2$ $$\frac{z'_1}{z'_2} = \frac{z''_1}{z''_2} = \frac{r_2^2}{r_1^2}$$

This is the rule for designing any wheel constructed according to my invention.

Having now particularly described and ascertained the nature of my said invention and in what manner the same is to be performed I declare what I claim is:

A rotary wheel for turbines, centrifugal pumps or fans which consists of two supporting bodies one of which is adapted to be mounted upon a rotary shaft and vanes secured to and connecting said bodies, said vanes and bodies having such configuration that the free edges of the vanes are upon lines located in surfaces of rotation concentric with the shaft along which lines the turning moment that may be derived from actuating fluid will be constant, and the intervening sections of the vanes lie successively in surfaces of rotation each of which conforms to the above description, all of these surfaces of rotation thus forming a uniform series of which those containing the edges are extremes, and the inner surfaces of the supporting bodies are surfaces of rotation having an axis of rotation common with the surfaces of rotation above mentioned, any section of either of which last named surfaces that lies in a plane which includes the axis of rotation will be a line along which the points are at distances from a given plane perpendicular to the axis inversely proportional to the areas of the circles concentric to the axis in which the points lie.

In witness whereof, I subscribe my signature, in presence of two witnesses.

HANS LORENZ.

Witnesses:
HENRY HASPER,
WOLDEMAR HAUPT.